(12) United States Patent
Fukuda et al.

(10) Patent No.: US 11,907,845 B2
(45) Date of Patent: Feb. 20, 2024

(54) TRAINING TEACHER MACHINE LEARNING MODELS USING LOSSLESS AND LOSSY BRANCHES

(71) Applicant: International Business Machines Corporation, Armonk, NY (US)

(72) Inventors: Takashi Fukuda, Tokyo (JP); Samuel Thomas, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 801 days.

(21) Appl. No.: 16/994,656

(22) Filed: Aug. 17, 2020

(65) Prior Publication Data

US 2022/0051105 A1   Feb. 17, 2022

(51) Int. Cl.
  *G06N 3/084* (2023.01)
  *G10L 15/16* (2006.01)
  *G06N 3/045* (2023.01)

(52) U.S. Cl.
  CPC ............. *G06N 3/084* (2013.01); *G06N 3/045* (2023.01); *G10L 15/16* (2013.01)

(58) Field of Classification Search
  CPC ........ G06N 3/084; G06N 3/045; G10L 15/16; G10L 15/063
  See application file for complete search history.

(56) References Cited

U.S. PATENT DOCUMENTS

2018/0336465 A1* 11/2018 Kim .................. G06N 3/08
2019/0304437 A1* 10/2019 Qian .................. G10L 15/063
2019/0378006 A1   12/2019 Fukuda
2020/0034702 A1   1/2020 Fukuda
2020/0034703 A1   1/2020 Fukuda

FOREIGN PATENT DOCUMENTS

CN        108986788 A    12/2018

OTHER PUBLICATIONS

Liu J, Han J, Yang L, Wang F, Lin F, Ren K. A Framework for Behavior Privacy Preserving in Radio Frequency Signal. arXiv preprint arXiv:2004.04909. Apr. 10, 2020. (Year: 2020).*
Fukuda T, Thomas S. Implicit Transfer of Privileged Acoustic Information in a Generalized Knowledge Distillation Framework. InInterspeech Oct. 25, 2020 (pp. 41-45). (Year: 2020).*

(Continued)

*Primary Examiner* — Oluwatosin O Alabi
(74) *Attorney, Agent, or Firm* — Gavin Giraud

(57) ABSTRACT

Some embodiments of the present invention are directed to techniques for training teacher neural networks (TNNs) and student neural networks (SNNs). A training data set is received with a lossless set of data and a corresponding lossy set of data. Two branches of a TNN are established, with one branch trained using the lossless data (a lossless branch) and one trained using the lossy data (a lossy branch). Weights for the two branches are tied together. The lossy branch, now isolated from the lossless branch, generates a set of soft targets for initializing an SNN. These generated soft targets benefit from the training of lossless branch through the weights that were tied together between each branch, despite isolating the lossless branch from the lossy branch during soft-target generation.

18 Claims, 11 Drawing Sheets

(56) References Cited

OTHER PUBLICATIONS

Chan, et al., "Transferring Knowledge from a RNN to a DNN", arXiv:1504.01483v1, Apr. 7, 2015, 5 pages, <https://arxiv.org/pdf/1504.01483.pdf>.

Fukuda, et al., "Efficient knowledge distillation from an ensemble of teachers", Interspeech 2017, Aug. 20-24, 2017, pp. 3697-3701, <https://www.semanticscholar.org/paper/Efficient-Knowledge-Distillation-from-an-Ensemble-Fukuda-Suzuki/86dc692fc0b6ee97077ae4132517cb8538802bcc>.

Fukuda, et al., "Mixed Bandwidth Acoustic Modeling Leveraging Knowledge Distillation", 2019 IEEE Automatic Speech Recognition and Understanding Workshop (ASRU), pp. 509-515, <https://ieeexplore.ieee.org/document/9003760>.

Fukuda, et al., "Teacher and Student Learning for Constructing Mixed-Domain Model", U.S. Appl. No. 16/003,790, filed Jun. 8, 2018.

Fukuda, et al., "Training of Student Neural Network With Switched Teacher Neural Networks", U.S. Appl. No. 16/047,287, filed Jul. 27, 2018.

He, et al., "A Twofold Siamese Network for Real-Time Object Tracking", arXiv:1802.08817v1, Feb. 24, 2018, 10 pages, <https://arxiv.org/pdf/1802.08817.pdf>.

Hinton, et al., "Distilling the Knowledge in a Neural Network", arXiv:1503.02531v1, Mar. 9, 2015, 9 pages, <https://arxiv.org/abs/1503.02531>.

Hsiao, et al., "Robust Speech Recognition in Unknown Reverberant and Noisy Conditions", 2015 IEEE Workshop on Automatic Speech Recognition and Understanding (ASRU), pp. 533-538, <https://ieeexplore.ieee.org/document/7404841>.

Ko, et al., "A Study on Data Augmentation of Reverberant Speech for Robust Speech Recognition", 2017 IEEE International Conference on Acoustics, Speech and Signal Processing (ICASSP), pp. 5220-5224, <https://ieeexplore.ieee.org/document/7953152>.

Koch, et al., "Siamese Neural Networks for One-shot Image Recognition", Proceedings of the 32nd International Conference on Machine Learning, 2015, 8 pages, <http://www.cs.cmu.edu/~rsalakhu/papers/oneshot1.pdf>.

Liu, et al., "Teacher-Students Knowledge Distillation for Siamese Trackers", arXiv:1907.10586v2, Nov. 25, 2019, 12 pages, <https://www.researchgate.net/publication/334669169_Teacher-Students_Knowledge_Distillation_for_Siamese_Trackers>.

Mosner, et al., "Improving Noise Robustness of Automatic Speech Recognition via Parallel Data and Teacher-Student Learning", ICASSP 2019—2019 IEEE International Conference on Acoustics, Speech and Signal Processing (ICASSP), pp. 6475-6479, <https://ieeexplore.ieee.org/document/8683422>.

Qian, et al., "Very Deep Convolutional Neural Networks for Noise Robust Speech Recognition", IEEE/ACM Transactions on Audio, Speech, and Language Processing, vol. 24, No. 12, Dec. 2016, pp. 2263-2276, <https://ieeexplore.ieee.org/document/7552554>.

Thomas, et al., "Improvements to the IBM Speech Activity Detection System for the Darpa Rats Program", 2015 IEEE International Conference on Acoustics, Speech and Signal Processing (ICASSP), pp. 4500-4504, <https://ieeexplore.ieee.org/document/7178822>.

Tu, et al., "Speech Enhancement Based on Teacher-Student Deep Learning Using Improved Speech Presence Probability for Noise-Robust Speech Recognition", IEEE/ACM Transactions on Audio, Speech, and Language Processing, vol. 27, No. 12, Dec. 2019, pp. 2080-2091, <https://ieeexplore.ieee.org/document/8834827>.

Tung, et al., "Similarity-Preserving Knowledge Distillation", 2019 IEEE/CVF International Conference on Computer Vision (ICCV), Oct. 27-Nov. 2, 2019, pp. 1365-1374, <https://ieeexplore.ieee.org/document/9010328>.

Vapnik, et al., "Learning Using Privileged Information: Similarity Control and Knowledge Transfer", Journal of Machine Learning Research, 16, (2015), pp. 2023-2049, <http://jmlr.csail.mit.edu/papers/volume16/vapnik15b/vapnik15b.pdf>.

Xu, et al., "Privileged Features Distillation at Taobao Recommendations", arXiv:1907.05171v2, Feb. 26, 2020, 9 pages, <https://arxiv.org/abs/1907.05171>.

Zhang, et al., "Deep Learning for Environmentally Robust Speech Recognition: An Overview of Recent Developments", arXiv:1705.10874v3, Sep. 21, 2018, 16 pages, <https://arxiv.org/pdf/1705.10874.pdf>.

* cited by examiner

*Performances (WER%) of baseline CNNs, ResNet teachers, and student CNNs on lossless and lossy test sets*

| Models | SWB | CH | SWB-LS | CH-LS | AVG |
|---|---|---|---|---|---|
| # 1 Baseline CNN (no T/S, hard labels only) | 14.3 | 24.9 | 18.9 | 30.1 | 22.1 |
| # 2 Baseline ResNet Teacher | 12.7 | 21.9 | 13.5 | 23.5 | 17.9 |
| # 3 ResNet-Student CNN with privileged information | 14.1 | 24.0 | 17.6 | 28.6 | 21.0 |
| # 4 ResNet-Student CNN without privileged information | 13.9 | 24.3 | 14.9 | 25.8 | 19.7 |
| # 5 Proposed Multiview ResNet Teacher | 12.5 | 21.5 | 13.3 | 23.2 | 17.6 |
| # 6 Proposed Multiview ResNet-Student CNN (Teacher mode-1) | 13.8 | 23.7 | 17.2 | 28.1 | 20.7 |
| # 7 Proposed Multiview ResNet-Student CNN (Teacher mode-2) | 13.3 | 23.4 | 14.3 | 25.1 | 19.0 |

FIG. 7

| Models | Lossy-spectrum augmentation used in student training time | | | Test-set clean | | Test-set Lossy | | Average |
|---|---|---|---|---|---|---|---|---|
| | ResNet Teacher | CNN Student | | Hub5 | CH | Hub5-LS | CH-LS | |
| Baseline CNN-LL | N/A | N/A | | 13.7 | 23.4 | 27.5 | 37.0 | 25.4 |
| Resnet-LL | N/A | N/A | | 12.6 | 21.5 | 23.3 | 33.8 | 22.8 |
| Student CNN-A | ON | ON | | 14.1 | 24.2 | 20.6 | 30.8 | 22.4 |
| Student CNN-B | OFF | ON | | 13.8 | 24.0 | 17.6 | 28.6 | 21.0 |
| Baseline CNN-LS | N/A | N/A | | 14.3 | 24.9 | 18.9 | 30.1 | 22.1 |
| Resnet-LS | N/A | N/A | | 12.7 | 21.9 | 13.5 | 23.5 | 17.9 |
| Student CNN-C | ON | ON | | 13.9 | 24.3 | 14.9 | 25.8 | 19.7 |
| Student CNN-D | OFF | ON | | 14.0 | 24.2 | 17.5 | 28.6 | 21.1 |
| Siamese Resnet-LS | N/A | N/A | | 12.6 | 21.5 | 13.6 | 23.7 | 17.9 |
| Student CNN-E (proposed) | ON | ON | | 13.6 | 23.4 | 14.6 | 25.2 | 19.2 |
| Student CNN-F (Using both privileged and student-view branch) | ON | ON | | 13.8 | 23.7 | 17.2 | 28.1 | 20.7 |

FIG. 11

TRAINING TEACHER MACHINE LEARNING MODELS USING LOSSLESS AND LOSSY BRANCHES

BACKGROUND

The present invention relates generally to the field of machine learning, and more particularly to training teacher and student neural networks for acoustic modeling.

Speech recognition is an interdisciplinary subfield of computer science and computational linguistics that develops technologies and methodologies that enable the recognition and conversion of spoken language into text by computers. It is also known as automatic speech recognition (ASR), computer speech recognition or speech to text (STT). It incorporates knowledge and research in the computer science, linguistics and computer engineering domains. An acoustic model is used in automatic speech recognition to define the relationship between an audio signal and the phonemes or other linguistic units that comprise speech. A phoneme is a unit of sound which distinguishes one word from another in a particular language. The model is typically drawn from a set of audio recordings and their respectively corresponding transcripts. Typically, an acoustic model is created by taking audio recordings of speech with their respective text transcriptions and using software to generate statistical representations of the sounds that make up each word.

In machine learning, knowledge distillation is the technique of transferring knowledge from a large model to a smaller one. While large models (such as very deep neural networks or ensembles of many models) are typically more capable at learning how to generalize from the data compared to smaller ones, they have the drawback of being computationally expensive to evaluate, which limits their applications to those with sufficiently powerful hardware. Knowledge distillation enables the transfer of knowledge learnt by a large model to a smaller one, which would not be able to easily learn it directly from the data itself. These techniques produce a new model that is faster to evaluate and deployable on less powerful hardware (such as a mobile device) while at the same time experiencing a relatively small loss of classification performance compared to the original large model. Knowledge distillation techniques (also known as "student-teacher training") have recently been investigated to make product level neural networks. In the knowledge distillation framework, a student neural network is trained with soft target outputs from powerful teacher neural networks, rather than hard targets.

SUMMARY

According to an aspect of the present invention, there is a method, computer program product and/or system that performs the following operations (not necessarily in the following order): (i) receiving a training data set, with the training data set including at least one lossy audio recording, at least one lossless audio recording and a corresponding label; (ii) training a teacher neural network with at least a first branch and a second branch, where the first branch is trained using the at least one lossless audio recording and the second branch is trained using the at least one lossy audio recording, where first branch is evaluated based, at least in part on the corresponding label and the second branch is evaluated based, at least in part, on outputs from the first branch; and (iii) responsive to receiving a test input data set including a lossy audio recording, generating a set of soft-targets for training a student network based, at least in part, on the second branch and the test input dataset.

BRIEF DESCRIPTION OF THE DRAWINGS

FIG. 7 is table showing results for a plurality of machine learning models for extracting text from audio recordings including the third embodiment method;

FIG. 11 is a table showing word error rate results of a plurality of machine learning models including the fourth embodiment method.

DETAILED DESCRIPTION

Figure 1:
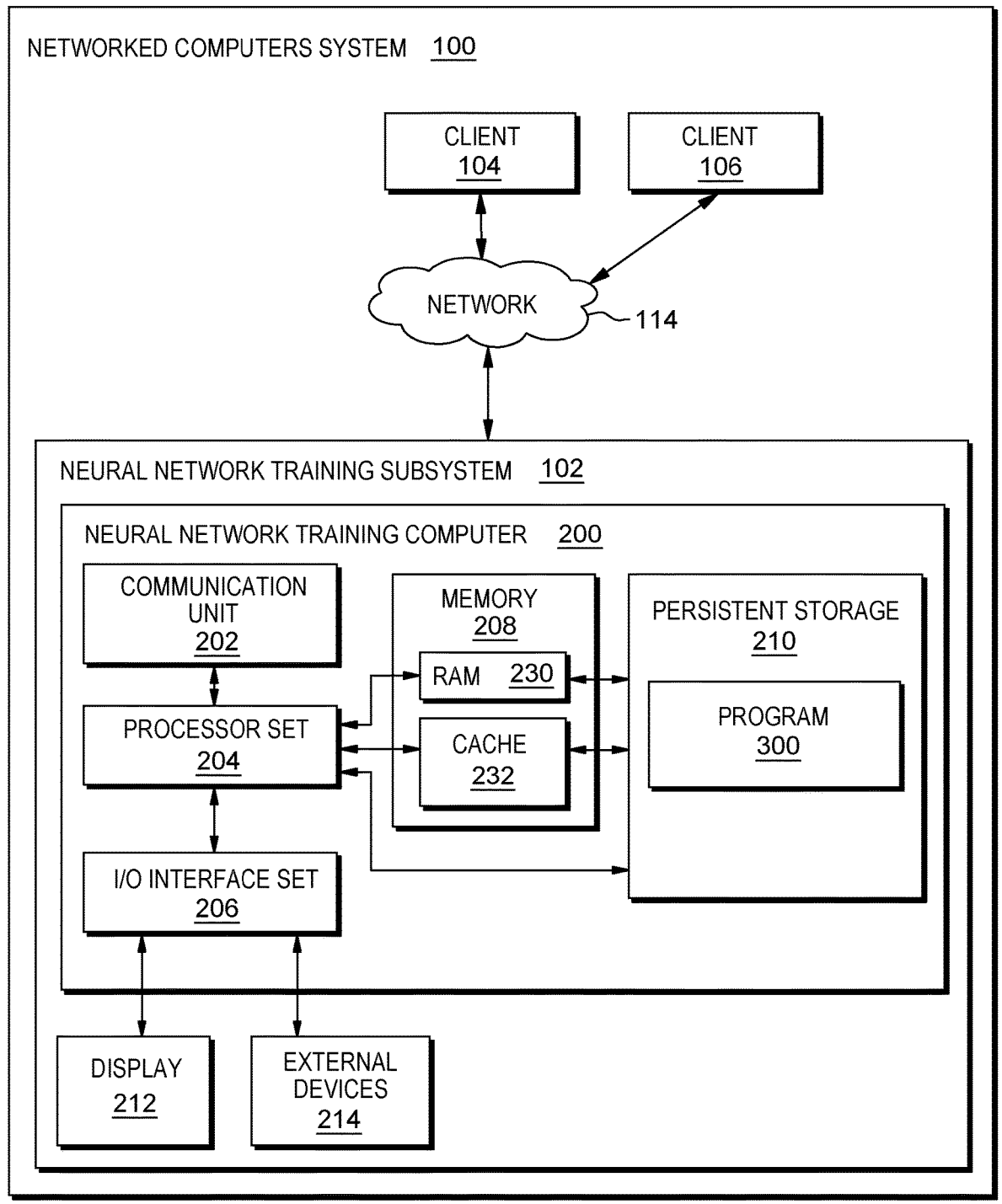
FIG. 1 is a block diagram view of a first embodiment of a system according to the present invention.

Some embodiments of the present invention are directed to techniques for training teacher neural networks (TNNs) and student neural networks (SNNs). A training data set is received with a lossless set of data and a corresponding lossy set of data. Two branches of a TNN are established, with one branch trained using the lossless data (a lossless branch) and one trained using the lossy data (a lossy branch). Weights for the two branches are tied together. The lossy branch, now isolated from the lossless branch, generates a set of soft targets for initializing an SNN. These generated soft targets benefit from the training of lossless branch through the weights that were tied together between each branch, despite isolating the lossless branch from the lossy branch during soft-target generation.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be any thing made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: neural network training subsystem 102 (sometimes herein referred to, more simply, as subsystem 102); client subsystems 104, 106; and communication network 114. Server subsystem 102 includes: neural network training computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with neural network training computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one or more embodiments, the acoustic features may include, but not limited to, MFCC (Mel Frequency Cepstral Coefficient), Mel-scaled spectrogram with no cosine transforms, raw FFT spectrogram, LPC (Linear Predictive Coding) Coefficient, PLP (Perceptual Liner Prediction) Cepstral Coefficient, or any combinations thereof. The acoustic features may further include dynamical features such as delta features and delta-delta features of the aforementioned acoustic features.

In one or more embodiments, audio recording data (both lossless and lossy) includes a series of frames, where each frame includes at least frequency information corresponding to an audio recording. Lossless audio recordings include complete, exact data as originally recorded at the source. Lossy audio recordings include incomplete or inexact data based on the data originally recorded at the source. Loss can be introduced to an audio recording from many causes, including network transmission (a packet containing some of the audio data may be lost in transmission), compression techniques, noise reduction techniques, etc.

II. Example Embodiment

Figure 2:
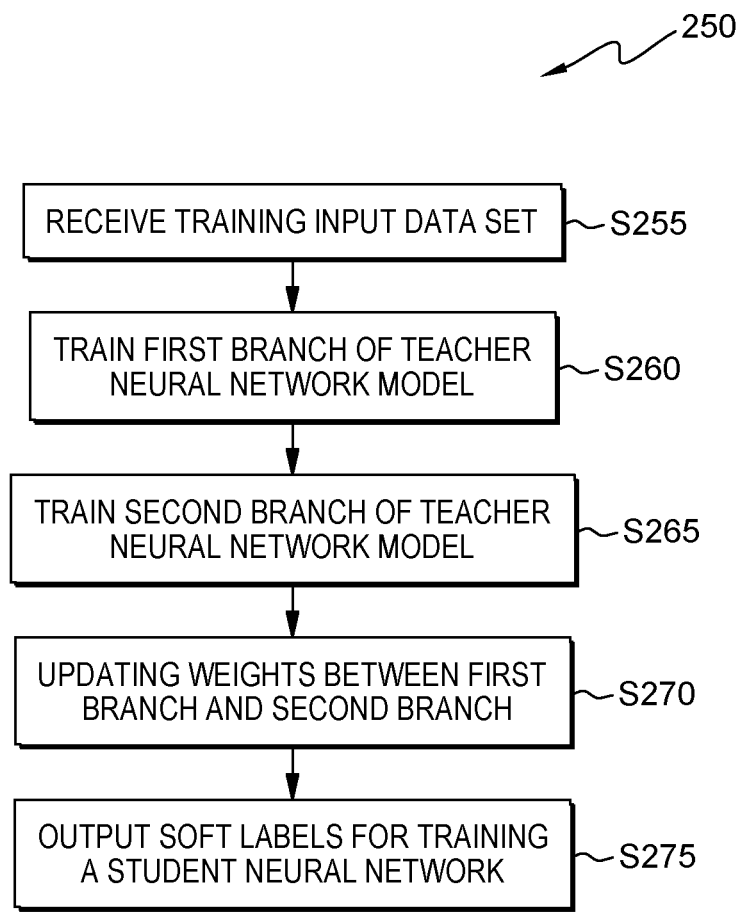
FIG. 2 is a flowchart showing a first embodiment method performed, at least in part, by the first embodiment system.
Figure 3:
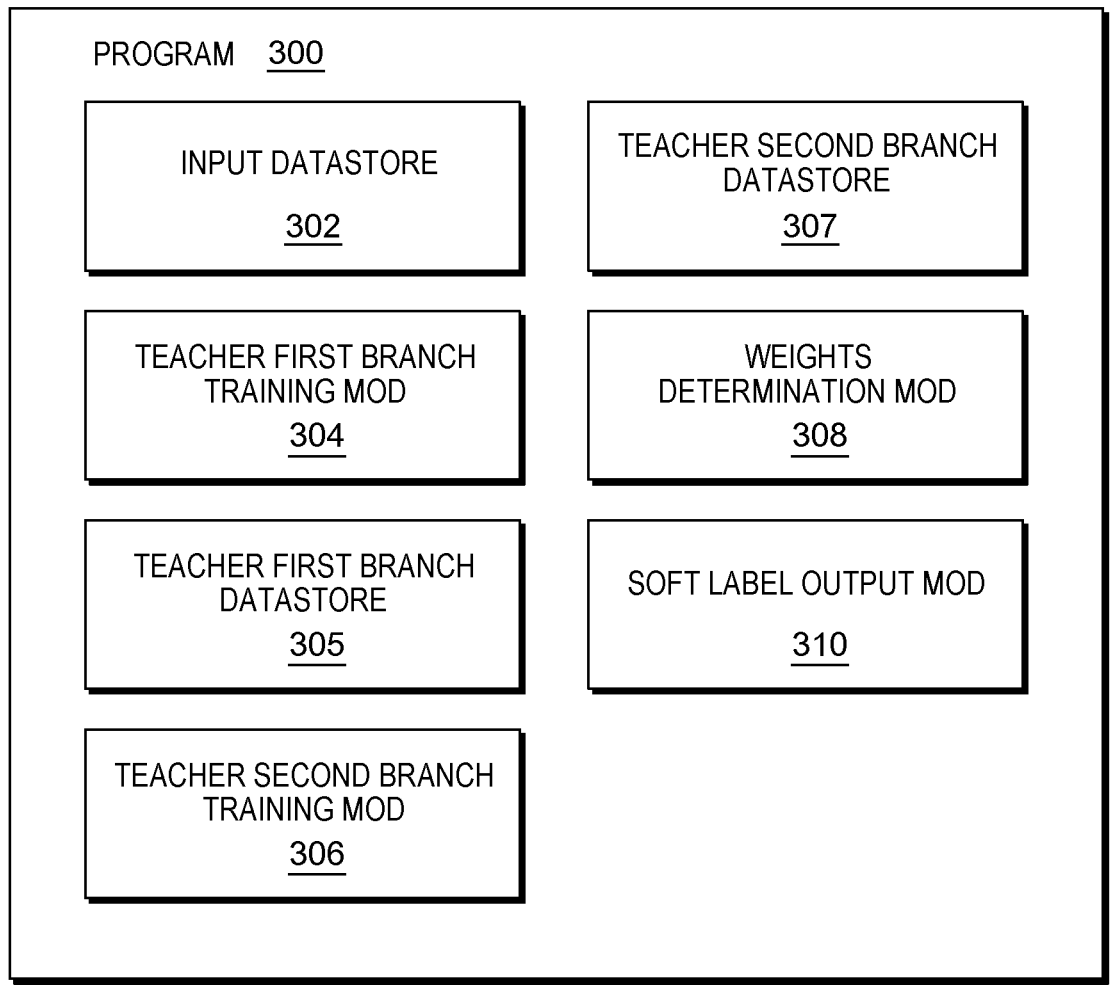
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation S255, where input datastore module ("mod") 302 receives a training input data set. In this simplified embodiment, the input data set includes a pair of lossless and lossy audio recordings of human speech with a corresponding label. The input data set further includes privileged data corresponding to the pair of lossless and lossy audio recordings of human speech, which may include at least one of the following types of information about the speaker (such as gender, age, body information, a native language, etc.) associated with the pair of lossless and lossy audio recordings of human speech. The input data set further includes a set of test input data which includes at least one lossy audio recording of human speech. In some alternative embodiments, the privileged data includes any other implicit information that is not included in the lossy signal comprising the lossy audio recordings.

Processing proceeds to operation S260, where teacher first branch training mod 304 trains a first branch of a teacher neural network. In this simplified embodiment, training the first branch of the teacher neural network includes processing the lossless audio recording of human speech to determine a set of audio features, also referred to as first branch output. In this simplified embodiment, the audio features are a set of phonemes. Training the first branch of the teacher neural network is further assisted by utilizing privileged data, which helps further classify or narrow down characteristics about the speaker to enhance accuracy of speech to text. This privileged information is concealed from the second branch and subsequent student neural networks that may result from this example method. The first branch output is then compared against the corresponding label to determine how accurate the first branch was at determining the audio features from the lossless audio recording of human speech, with the difference between the first branch output and the corresponding label quantified as a first loss value. At this operation, a weight for the first and second branch is initialized, and the first branch and its associated weight are stored in teacher first branch datastore 305. In this simplified embodiment, operation S260 is performed once. In alternative embodiments, this operation is performed many times in an iterative fashion, after processing of operation S270. In subsequent iterations of S260, the weights are not re-initialized. In some alternative embodiments, the neural network typically has both weight and bias parameters.

Processing proceeds to operation S265, where teacher second branch training mod 306 trains a second branch of the teacher neural network. In this simplified embodiment, training the second branch of the teacher neural network includes processing the lossy audio recording of human speech to determine a set of audio features, also referred to as second branch output. This second branch does not have access to the lossless audio recording of human speech or the privileged data. The second branch output is then compared against the first branch output to determine how accurate the second branch was at determining the audio features from the lossy audio recording of human speech, with the difference between the second branch output and the first branch output quantified as a second loss value. The trained second branch and its associated weight (initialized at S260) are stored in teacher second branch datastore 307. As the first branch was trained using lossless audio recordings (as opposed to lossy audio recordings), as well as privileged data, the first branch output can reasonably be expected to be more accurate at determining audio features than the second branch output.

Processing proceeds to operation S270, where weights determination mod 308 updates weights between the first branch and the second branch. In this simplified embodiment, updating the weights between the first branch and the second branch includes summing the difference between the first loss value and the second loss value according to a backpropagation technique. These loss values are weighted by another weight value to interpolate those weights, (for example, each loss value may be multiplied by 0.5 to normalize the loss value). The summed (and interpolated) loss value is used for each branch, instead of their respective individual loss values, to modify their respective weights. These weights are used for subsequent iterations of steps S260 and S265. In alternative embodiments, other techniques for managing and updating the weights are used.

Figure 4:
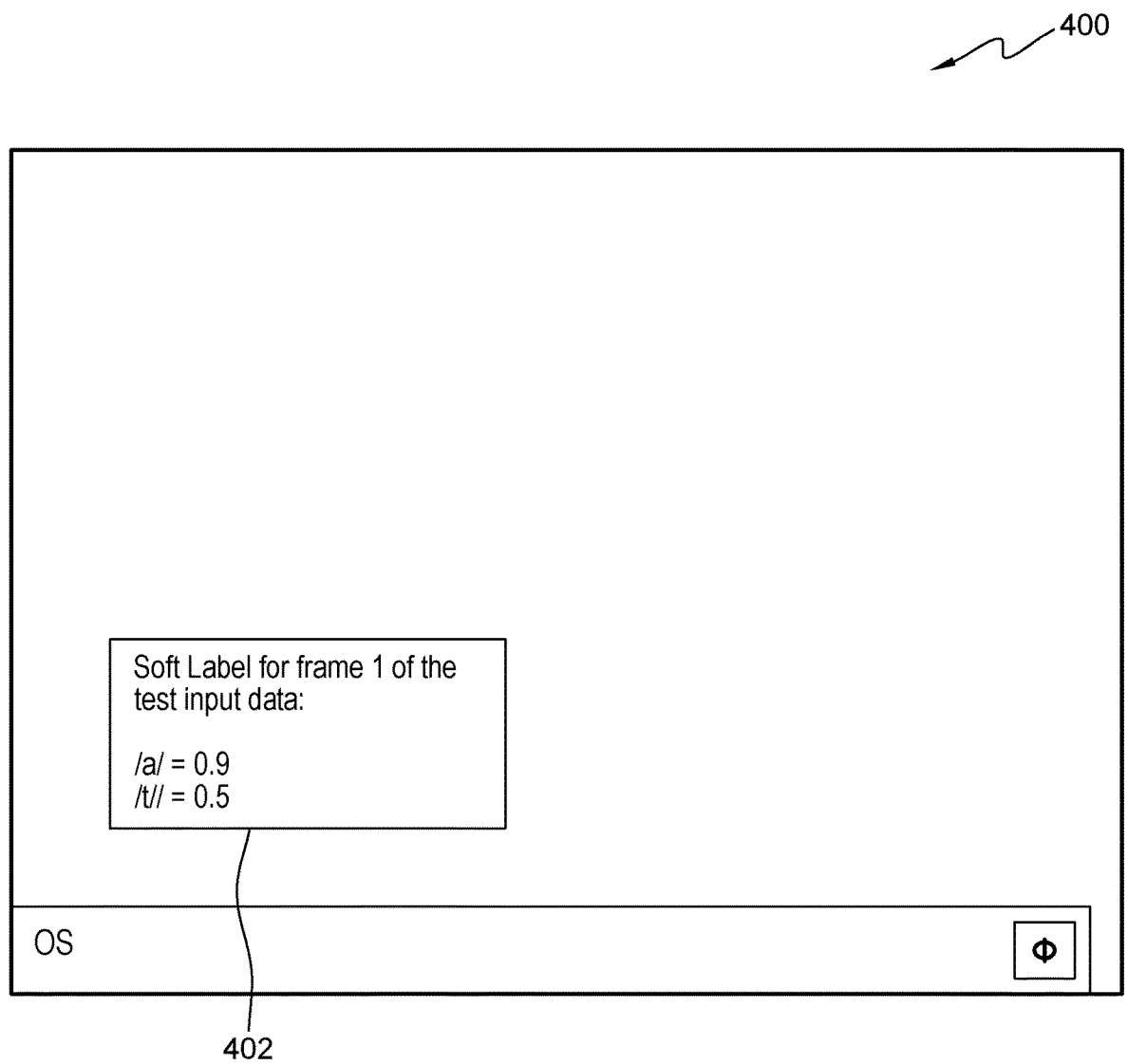
FIG. 4 is a screenshot view generated by the first embodiment system.

Processing proceeds to operation S275, where soft label output mod 310 outputs soft labels for training a student neural network. In this simplified embodiment, the soft label output mod outputs a soft label generated by the second branch of the teacher neural network based on the set of test input data. In this simplified embodiment, a soft label is a set of probabilities or likelihoods that a specific phoneme is present in the lossy audio recording of human speech for each frame of the audio recording. For example, a 90% likelihood that the first frame is "/a/", a 5% likelihood that the first frame is "/t/", and so on, repeating for each frame of a given audio recording. In this simplified embodiment, a soft label includes a vector for each frame of an audio recording, where vector includes n number of dimensions, and each dimension of the vector includes a decimal value between 0 and 1.0 that describes the likelihood that a given phoneme is present, with n corresponding to how many different phonemes are potentially present in the frame. This is contrasted with a hard label, which is definitive of which phonemes are present at any given frame. For example, frame 1 is "/a/", frame 2 is "/t/", etc. In some alternative embodiments, the generated soft label is then used to train a student neural network. This student neural network, though deprived of access to the privileged data, benefits from the improved accuracy yielded from the first branch (with its privileged data) training the second branch to generate soft labels. A soft label may be outputted over a computer network to a user interface of a computer display connected to a computer device, such as message 402 of screenshot 400 of FIG. 4.

III. Further Comments and/or Embodiments

Some embodiments of the present invention recognize the following facts, potential problems and/or potential areas for improvement with respect to the current state of the art: (i)

some state of the art speech to text services receive and process many utterances from users on a daily basis; (ii) input audio data from real users sometimes includes partial losses of time-frequency spectra because of: (a) network conditions, (b) strong noise reduction process, and so on; (iii) these losses contain missing features in a specific frequency range for a significant time span that lead to a drastic degradation on automatic speech recognition (ASR) performance compared to lossless acoustic features; and (iv) methods based on knowledge distillation for the construction of NN-based acoustic models.

Some embodiments of the present invention recognize the following facts, potential problems and/or potential areas for improvement with respect to the current state of the art: (i) as automatic speech recognition (ASR) systems become ubiquitous, these systems have to process user inputs from various acoustic settings; (ii) typical speech processed by these systems include inputs from environments with stationary and non-stationary noises; (iii) for example, restaurants or exhibition halls, meeting recordings in very reverberant settings, emotional speech, and distorted signals with time-frequency bandwidth loss due to faulty devices or transmission network conditions; (iv) to effectively handle these noisy inputs, dedicated acoustic models for specific target domains are usually developed; (v) ASR system are often made robust to additive and convolutive distortions known to be present in these various environments, using data augmentation techniques that incorporate these noises; (vi) in contrast, lossy spectra due to distortions introduced by recording devices or communication networks are hard to predict in advance and are difficult to process effectively; (vii) to cope with such novel acoustic degradations to the input signals, it is important to improve the robustness of acoustic models to various lossy spectra; (viii) one straightforward approach to handle this problem is to include speech data with artificially distorted lossy spectra to the training data set; and (ix) while this method can increase the robustness of ASR models to lossy spectra, it has been observed that the performance of such models on normal (lossless) speech often degrades, given that the training data distribution has changed.

Some embodiments of the present invention recognize the following facts, potential problems and/or potential areas for improvement with respect to the current state of the art: (i) knowledge distillation is a technique to mimic complicated teacher networks with a simple student network; (ii) applying techniques based on knowledge distillation to ASR have recently received considerable attention in the community; (iii) in the knowledge distillation framework, instead of training models which have reduced computational requirements and improved latency performances directly on hard targets in a single step, training is performed in two separate steps; (iv) in the first step, complex teacher neural network (such as bidirectional LSTM, VGG, and ResNet models) are initially trained using hard targets; (v) compact acoustic models or student networks are then trained on the soft outputs of teachers using a training criteria that minimizes the differences between the student and teacher distributions; and (vi) this technique has been shown promise in various settings—fully supervised, semisupervised, multilingual, sequence training, CTC models to train student networks that perform better than training similar models from scratch using just hard targets.

Some embodiments of the present invention may include one, or more, of the following operations, features, characteristics and/or advantages: (i) a technique to train an acoustic model based on neural networks (NNs) with a generalized knowledge distillation framework; (ii) during training a teacher network, the network is trained to learn from privileged knowledge using the special architecture which has a privileged view branch and a student network view branch; (iii) it learns to predict the current outputs for lossy features; (iv) after this initial training step, the teacher network generates outputs using just the lossy features for generating the soft-targets for training a student network; (v) since the network has been trained in this multi-view style it does not need the privileged branch for generating test posteriors; (vi) the outputs are better than just training on lossy features because of the privileged knowledge step; (vii) use the teacher network to initialize the student; (viii) the first and second branches are trained in Siamese style with tied weights; the network can still perform independently even without the lossless component; (ix) using privileged knowledge only on the training stage of acoustic models; (x) no extra computational cost during decoding is required; and (xi) this significantly improves ASR performance for speech data that includes losses of frequency bandwidth without any degradation on normal (lossless spectrum) speech data.

Figure 5:
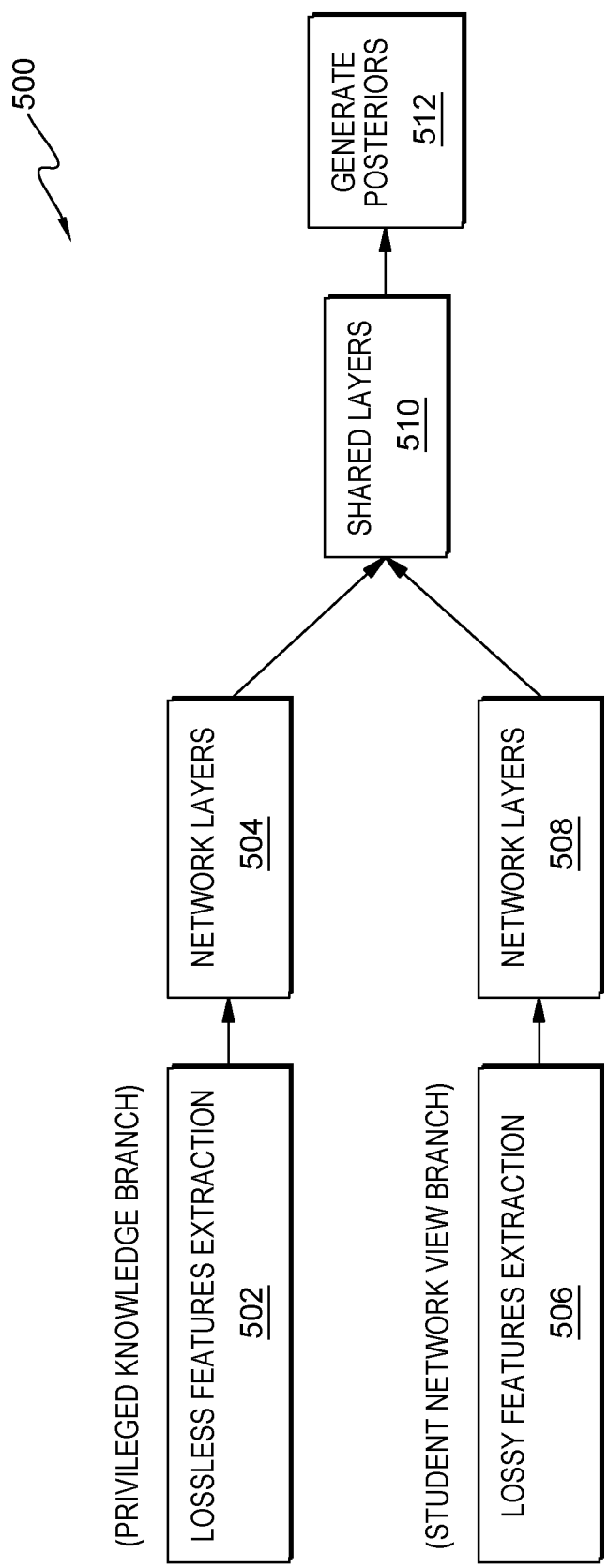
FIG. 5 is a flowchart showing a second embodiment method.

Flowchart 500 of FIG. 5 shows a second embodiment method, including at least some of the following steps: (i) lossless features extraction 502, of the privileged knowledge branch; (ii) network layers 504; (iii) lossy features extraction 506 of the student network view branch; (iv) network layers 508; shared layers 510; and generate posteriors 512.

Some embodiments of the present invention may include one, or more, of the following operations, features, characteristics and/or advantages: (i) preparing a twofold Siamese network as a teacher model and computing a loss from the teacher network; (ii) removing privileged-view branch for generating soft labels while training student network; (iii) special acoustic knowledge (privileged information) does not sometimes contribute to the improvement of the student network; (iv) especially when the gap of acoustic feature pairs between teacher and student is large; and (v) targeting lossy spectrum as acoustically degraded signals.

Some embodiments of the present invention leverage a method including at least some of the following steps (not necessarily in the following order): (i) a method for training a teacher model; (ii) preparing a twofold Siamese network as a teacher model and training data sets, the twofold Siamese network having a first and a second branch networks, the first branch network and the second branch network sharing weights, each training data set being a pair of loss-less and lossy input data and a corresponding label; and (iii) for each training data set: (a) passing the lossless input data through the first branch network to compute a first loss between an output of the first branch network and the corresponding label, (b) passing the lossy input data through the second branch network to compute a second loss between an output of the second branch network and the first output of the first branch network, and (c) updating the weights by using a sum of the first and second loss according to backpropagation technique. Some embodiments of the present invention leverage the preceding method further augmented by the following step: generating soft labels by inputting lossy input data set for training a student model into the trained second branch network.

Some embodiments of the present invention may include one, or more, of the following operations, features, characteristics and/or advantages: (i) a novel generalized knowledge distillation framework with an implicit transfer of privileged information; (ii) in this proposed framework, teacher networks are trained with two input branches on pairs of time-synchronous lossless and lossy acoustic features; (iii) while one branch of the teacher network processes a privileged view of the data using lossless features, the second branch models a student view, by processing lossy features corresponding to the same data; (iv) during the training step, weights of this teacher network are updated using a composite two-part cross entropy loss; (v) the first part of this loss is computed between the predicted output labels of the lossless data and the actual ground truth; (vi) the second part of the loss is computed between the predicted output labels of the lossy data and lossless data; (vii) in the next step of generating soft labels, only the student view branch of the teacher is used with lossy data; (viii) the benefit of this proposed technique is shown on speech signals with long-term time-frequency bandwidth loss due to recording devices and network conditions; (ix) compared to conventional generalized knowledge distillation with privileged information, the proposed technique has a relative improvement of 9.5% on both lossless and lossy test sets; (x) a technique to construct robust acoustic models that can process speech signals with such lossy spectra; (xi) a novel technique based on knowledge distillation to alleviate this problem while also being robust to lossy spectra; (xii) the teacher network has two branches similar to a Siamese network with shared weights; (xiii) while one of the two branches processes privileged information available during training (privileged view branch), the other part is trained on a data view available to the student network that eventually will be trained and deployed (student view branch); (xiv) in terms of input features, this framework allows the privileged information branch to receive lossless features available only during training; and (xv) the student view branch, on the other hand, processes paired time synchronous lossy features.

Some embodiments of the present invention may include one, or more, of the following operations, features, characteristics and/or advantages: (i) by incorporating lossless features also into training, the network will be able to incorporate this privileged knowledge into soft labels needed to train a student network; (ii) this proposed teacher network is trained with a composite two-part cross entropy loss; (iii) in experiments with the Switchboard corpus and an artificially created lossy version of this corpus, the proposed technique significantly improves performance on lossy feature inputs without any degradations to lossless feature inputs; (iv) the technique provides a significant relative improvement of 9.5% over conventional generalized knowledge distillation techniques; and (v) the proposed technique builds on two key components to train robust acoustic models: (a) knowledge distillation to train efficient student networks, and (b) privileged knowledge to enhance the soft labels used to train the student networks.

Some embodiments of the present invention utilize a knowledge distillation training approach which, instead of using the ground truth labels, the knowledge distillation training approach defines the loss function with an index of context dependent phones i as Equation 1:

$$\mathcal{L}(\theta) = -\sum_i q(i|x) \log p(i|x), \qquad \text{Eq. (1)}$$

where $q(i|x)$ is the so-called soft label from the teacher network for input feature $x \in \hat{X}$, which also works as a pseudo label. $p(i|x)$ is output probability of the class from the student network. With soft labels $q(i|x)$, competing classes will have small but non-zero posterior probabilities for each training example. The KL-divergence criterion used for training the student model equivalently also minimizes the cross entropy of the soft target labels. Usually, the same acoustic feature inputs are used to generate posteriors $q(i|x)$ and $p(i|x)$.

Some embodiments of the present invention utilize a modified knowledge distillation technique, where in addition to distillation of information from teacher networks, privileged information available only during training is also factored in. The generalized knowledge distillation training with privileged information is expressed with soft label $q(i|\hat{x})$ generated with better quality feature $\hat{x}$ which is time-aligned to the degraded quality feature x as:

$$\mathcal{L}(\theta) = -\sum_i q(i|\hat{x}) \log p(i|x), \qquad \text{Eq. (2)}$$

where the teacher network is trained with acoustically better quality features $\hat{x} \in \hat{X}$ (or both $x \in X$ and $\hat{x} \in \hat{X}$). Instead of using x, the corresponding better feature $\hat{x}$ is used to generate better soft labels $q(i|\hat{x})$ while degraded features are used to estimate posteriors $p(i|x)$ for the student network. By training acoustic models with this scheme, the student network tries to incorporate special knowledge from $\hat{x}$, which results in creating robust acoustic models against adverse acoustic conditions.

Some embodiments of the present invention may include one, or more, of the following operations, features, characteristics and/or advantages: (i) the proposed technique has a teacher network training stage, followed by a subsequent training of a student network as an acoustic model for test deployment; (ii) a significant difference of this approach compared to standard knowledge distillation techniques is that the teacher network has two input branches that process a pair of lossless and lossy features; (iii) while training the teacher network, a cross entropy loss is computed not only from hard label targets but also uses the loss from the privileged information view branch; (iv) the student network has only a single branch that is used for test time decoding; (v) soft labels used for updating weights in the student are created from the teacher network after the privileged view branch is removed out; and (vi) while some of the embodiment techniques are primarily directed towards acoustic models that are robust to lossy spectra, the proposed techniques may be applied to any other different combination of acoustic factors, for example clean and distorted speech with additive noise.

Some embodiments of the present invention a teacher network with two branches similar to a Siamese network: one branch receives lossless inputs as a privileged information branch while the other receives lossy (or lossless) inputs as a student network view branch. The teacher network processes a pair of lossy features $x \in X$ and lossless features $\hat{x} \in \hat{X}$ which are time synchronous. In this network, several layers at the input are considered as feature processing layers. Weights of these layers are hence tied between the two feature input heads. The remaining classifier layers in the teacher network are shared. To update weights of this teacher network, the training loss is computed in parts from two separate passes of the data. The cross entropy loss $T_{prv}(\theta)$ corresponding to the privileged knowledge branch is first computed between predicted output for lossless data $p_{prv}(i|\hat{x})$ and ground truth labels $t_i$ by passing lossless data as:

$$T_{prv}(\theta) = -\sum_i t_i \log p_{prv}(i \mid \hat{x}),  \quad \text{Eq. (3)}$$

In the next training step, lossy data is passed through the network and a second loss $T_{st}(\theta)$ corresponding to the student view branch is computed between the predicted output for lossy data $p_{st}(i|x)$ and the predicted output for lossless data $p_{prv}(i|\hat{x})$, estimated in the first pass. $T_{st}(\theta)$ is expressed as:

$$T_{st}(\theta) = -\sum_i p_{prv}(i \mid \hat{x}) \log p_{st}(i \mid x), \quad \text{Eq. (4)}$$

The teacher network's parameters are updated to minimize the combined cross entropy loss, given as:

$$T(\theta) = (1-\lambda)T_{prv}(\theta) + \lambda T_{st}(\theta), \quad \text{Eq. (5)}$$

where $\lambda$ is the loss weight. In this example, $\lambda$ is fixed at 0.5. The proposed two part loss used to train the teacher network can be considered as a pseudo knowledge distillation step on the teacher side. By being given access to two input features, the network is able to learn differences between the features. The proposed loss function also encourages the network to incorporate privileged information unique to the lossless data into the learning process. The teacher networks are trained on a mix of both lossy and lossless features. While training models on this data set, the student view branch receives either lossless or lossy features. In both these approaches, the input at the privileged information branch are always lossless features. When the student branch receives lossless features, the teacher model is updated equal to a single cross entropy loss.

Some embodiments of the present invention may include one, or more, of the following operations, features, characteristics and/or advantages: (i) similar to the teacher network, the student networks are also trained on a mix of lossy and lossless features; (ii) soft targets corresponding to these features are generated using trained teacher networks described above; (iii) the teacher network can however be used in two modes to generate the soft targets; (iv) in the first mode (Teacher mode-1) both the privileged information branch and the student view branch are used to generate soft targets, similar to how the teacher network is trained; (v) in a second mode (Teacher mode-2), the privileged view branch in the teacher is discarded and instead the student view branch is only used; (vi) as described earlier, for both these modes, the privileged view branch receives only lossless features while the student view can process either lossless or lossy features; (vii) once soft targets have been extracted, the student network parameters are updated using the criterion outlined above in Equation 1; (viii) student training with (Teacher mode-2) is a novel addition to the general knowledge distillation training framework; (ix) when the student network is updated with Teacher mode-2, corresponding soft labels q(i|x) are generated from the proposed teacher network only using the student view branch with the same feature pair as the student network; (x) although these soft labels are created without using privileged features corresponding to lossy inputs, privileged knowledge is implicitly transferred by the teacher network; and (xi) this implicit information is obtained by the teacher network from lossless features during its training procedure.

Some embodiments of the present invention may include one, or more, of the following operations, features, characteristics and/or advantages: (i) efficacy of the proposed knowledge distillation framework has been measured using a series of experiments using the Switchboard English conversational telephone corpus and an in-house telephony speech collection, both sampled at 8 kHz; (ii) a training set is first constructed by randomly selecting 25-hours of telephony data from the Switchboard corpus and an inhouse data collection; (iii) this data is further artificially corrupted with different ambient noises, including more than 100 types of noises such as babble and office room noises at 5-25 dB SNR range are used to create a modified 100-hour training set that models a realistic diversity of acoustic conditions; (iv) because the 100-hour training set has no bandwidth loss in the signal, it is used as a lossless training set although the data set has only been corrupted with additive noises; (v) a lossy training set is further created by corrupting the lossless training set with bandwidth distortions; (vi) these distortions are introduced in 1-8 contiguous frequency bins at different frequency positions by zeroing out information in those frequency bins; (vii) the lossless and lossy training data sets are then used to train various models using the proposed framework; (viii) the artificial lossy spectra distortion used is similar to frequency masking in SpecAugment; (ix) the time masking in SpecAugment is another possible distortion that can be used; (x) the standard Hub5-2000 Switchboard (SWB) and CallHome (CH) test sets are used as lossless test sets to measure the efficacy of the proposed technique; and (xi) similar to the lossy training data creation, bandwidth distortions at 1-8 contiguous frequency bins are also added at various frequency positions to the lossless SWB and CH test data to create lossy versions of the test sets (SWB-LS and CH-LS).

Some embodiments of the present invention may include one, or more, of the following operations, features, characteristics and/or advantages: (i) neural network based acoustic models are trained on the data set described above; (ii) CNN based acoustic models are constructed as student networks on a mixed set of the lossless and lossy training data sets with 40 dimensional log Mel-frequency spectra augmented with $\Delta$ and $\Delta\Delta$s as inputs; (iii) the log Mel-frequency spectra are extracted by first applying Mel scale integrators on power spectral estimates in short analysis windows (25 ms) of the signal followed by the log transform; (iv) each frame of speech is also appended with a context of 11 frames after applying a speaker independent global mean and variance normalization; (v) the CNN systems use two convolutional layers with 128 and 256 hidden nodes each in addition to four fully connected layers with 2048 per layer to estimate posterior probabilities of 9300 output targets; (vi) all of the 128 nodes in the first feature extracting layer are attached with 9×9 filters that are two dimensionally convolved with the input log Mel filterbank representations; (vii) the second feature extracting layer with 256 nodes has a similar set of 3×4 filters that processes the non-linear activations after max pooling from the preceding layer; (viii) the non-linear outputs from the second feature extracting layer are then passed onto the subsequent fully connected layers; (ix) all the layers use the ReLU non-linearity; (x) with the same training data set, residual networks (ResNet) are trained as the teacher networks; (xi) these networks have 12 convolutional layers, with a shortcut connection inserted every 3 convolutional layers to compose residual blocks, followed by 4 fully connected layers; (xii) the convolutional layers in each residual block have 64, 128, 256, and 512 nodes with 3×3 filters from the bottom of the network; (xiii) batch normalization is also applied to every layer; and (xiv) two ResNet teachers are trained for comparison: (a) one teacher is trained with a single mixed set of the lossless and lossy training sets, and (b) the other is trained on a pair of lossless and lossy sets as discussed above.

Figure 6:
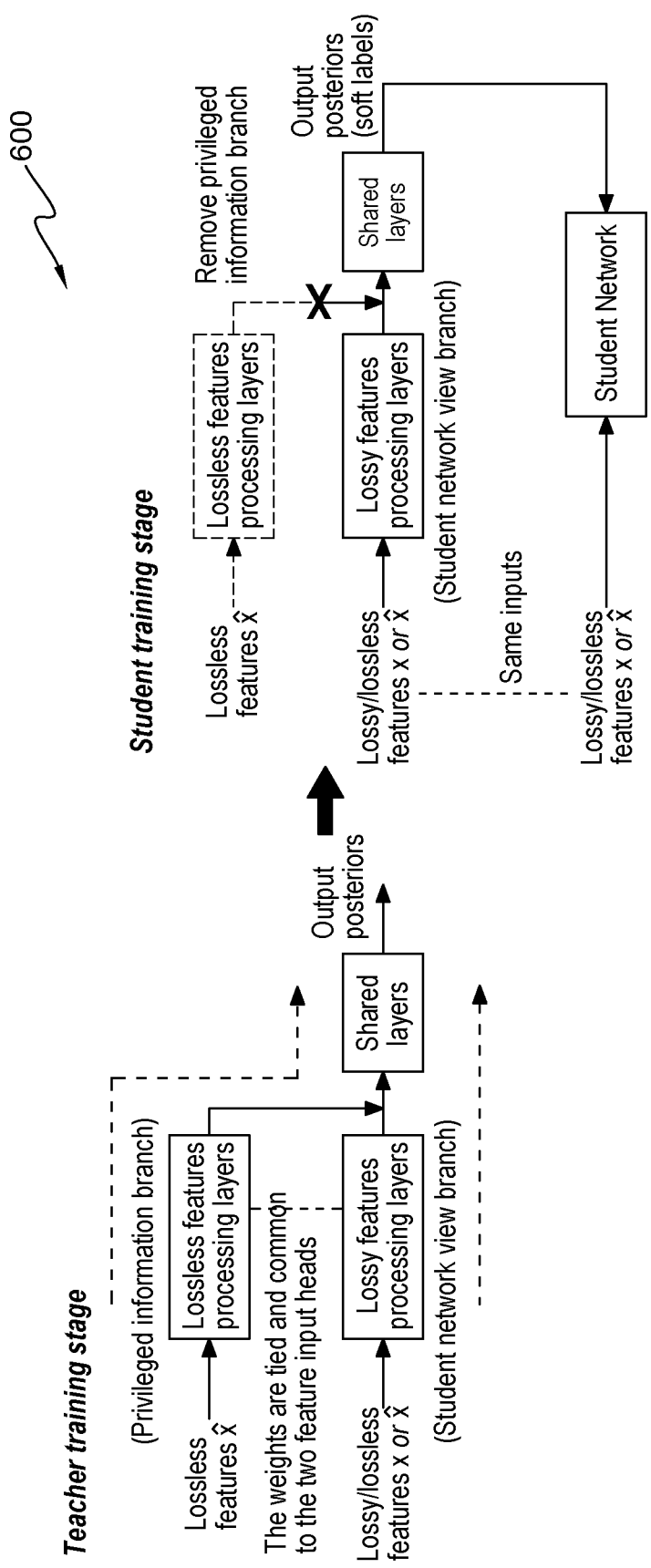
FIG. 6 is a diagram showing a third embodiment method.

Diagram 600 of FIG. 6 shows a third embodiment method.

Table 700 of FIG. 7 shows performance word error rate percentages for a plurality of machine learning models trained to extract text from speech on lossy and/or lossless test sets, including results based on the third embodiment system.

Some embodiments of the present invention may include Table 700 of FIG. 7 and one, or more, of the following operations, features, characteristics and/or advantages: (i) evaluate the effectiveness of the proposed technique on both the lossless and lossy SWB and CH test sets; (ii) given that student networks are trained on both lossy and lossless data, it is challenging for these networks to perform consistently well on both test sets compared to domain specific models trained on just one kind of data because of the data balance; (iii) consistent improvements on both test sets are from knowledge incorporated by the student networks through the novel knowledge distillation; (iv) experimental results with various student and teacher models are shown in Table 700 of FIG. 7; (v) the baseline CNN (#1) corresponds to a CNN trained with hard labels; (vi) the topology of this network is the same as the other CNN student networks in our experiments, except that it is not trained using the knowledge distillation framework; (vii) the baseline ResNet teacher (#2) is a teacher network trained also on hard labels only; (viii) these models, trained on the mixed training set of lossless and lossy data, are used to compare between standard knowledge distillation training and the ML model trained according to the proposed techniques; (ix) as seen Table 1, the ResNet teacher shows significantly better performance than the baseline CNN although the decoding speed is very slow; (x) two student networks are trained using this teacher model; (xi) the difference between the two student models is based on how the soft targets from the teacher network are created; (xii) since the teacher network is trained on a mixed training set of lossless and lossy data, it can be used to produce soft targets using either lossless or lossy data; (xiii) student network (#3) is trained using soft labels created with only lossless inputs to the teacher; (xiv) in contrast, for the student network in (#4), soft labels to train the student network are generated by the teacher network (#2) using corresponding lossless or lossy input features; (xv) both networks in (#3) and (#4) are trained with the standard knowledge distillation technique as expressed in Equations (1) and (2) and show improved performance over the baseline CNN system; (xvi) in most cases student (#4) performs better than (#3), suggesting that while extracting soft labels for training the student network, generating the labels with corresponding matched lossy or lossless inputs is more advantageous in this setting; (xvii) however by choosing this state of the art option, potential benefits of using lossless inputs for soft label generation are missed; and (xviii) it is possible that there is a significant acoustic mismatch between the lossy and lossless data and this prevents the student models from learning from just the lossless data.

Some embodiments of the present invention may include Table 700 of FIG. 7 and one, or more, of the following operations, features, characteristics and/or advantages: (i) the proposed knowledge distillation framework attempts to circumvent this issue with a multi-view style training with both lossless and lossy data; (ii) as discussed earlier, with the proposed two part loss, a pseudo-knowledge distillation step is performed during the teacher training; (iii) this encourages the network to incorporate privileged information unique to the lossless data into the learning process; (iv) during the soft label generation stage, lossy data can then be used to effectively generate soft targets; (v) a multi-view style teacher network trained using the proposed framework (#5) has results similar to the ResNet teacher (#2) on average, but contains special acoustic knowledge obtained from the differences between lossy and lossless data; (vi) this teacher network is then used to generate soft targets for student network training; (vi) first generate soft targets using a pair of lossless and lossy features with (Teacher mode-1) of the teacher network as described above, corresponding to #6 on this table; (vii) in this setting both branches of the teacher network are used to generate soft targets for the student network; (viii) the student network is better than (#3) but lags behind (#4); (ix) this result shows the benefit of the proposed network while still highlighting that the gains might be lower because of the use of mismatched lossless data for soft target generation against the actual student inputs; (x) in the next framework, only the single features in (Teacher mode-2) of the teacher network are used to generate soft labels as described earlier; (xi) in this setting, only the student view branch of the teacher network is used; (xii) the teacher network does not explicitly use any privileged lossless data to generate soft targets for lossy data; (xiii) the proposed student network (#7) improves across all test sets and provides 9.5% and 3.6% relative improvements over the baseline student systems (#3) and (#4); (xiv) unlike earlier, the soft targets to train the student network are estimated just from the same feature inputs; (xv) the model is however able to perform well on both lossy and lossless test sets; (xvi) these results indicate that the teacher network can successfully integrate privileged knowledge derived from the corresponding lossless features to the student network using the proposed training process.

Some embodiments of the present invention may include one, or more, of the following operations, features, characteristics and/or advantages: (i) a novel knowledge distillation training strategy to construct neural network based acoustic model that are robust to signals with time frequency bandwidth loss; (ii) transfer privileged acoustic knowledge to student networks using a multi-view style knowledge distillation framework; (iii) experiments on signals with lossy spectra show that the proposed techniques can effectively leverage information from lossless data available only training; and (iv) the technique provides a significant relative improvement of 9.5% over conventional generalized knowledge distillation techniques.

Some embodiments of the present invention include a method with at least some of the following steps, not necessarily in the following order: (i) teacher training—create a multi-view style network where one branch receives loss-less inputs and the other branch receives lossy inputs, with shared weights between them; (ii) data is a pair of loss-less and lossy acoustic features and their corresponding ground truth labels; (iii) pass the loss-less data through the network and compute cross entropy loss between predicted output (A) and ground truth (hard) labels (G) to determine loss1; (iv) pass the corresponding lossy data through the network and compute cross entropy loss between predicted output (B) and (A) to determine loss 2; (v) backprop the loss (loss1+loss2); and (vi) update weights.

Some embodiments of the present invention include a method with at least some of the following steps, not necessarily in the following order: (i) teacher training— create a multi-view style network where one branch receives loss-less inputs and the other branch receives lossy inputs, with shared weights between them; (ii) data is a pair of loss-less and lossy acoustic features and their corresponding ground truth labels; (iii) pass the loss-less data through the network and compute cross entropy loss between predicted output (A) and ground truth (hard) labels (G) to determine loss1; (iv) pass the corresponding lossy data through the network and compute cross entropy loss between predicted output (B) and (A) to determine loss 2; (v) backprop the loss (loss1+loss2); (vi) update weights; (vii) student training—once a suitable teacher (Teacher-LS) has been trained above, use it to train a student network; and (viii) while generating soft labels used for the target of the student network, the privileged-view branch in the teacher is removed.

Figure 8:
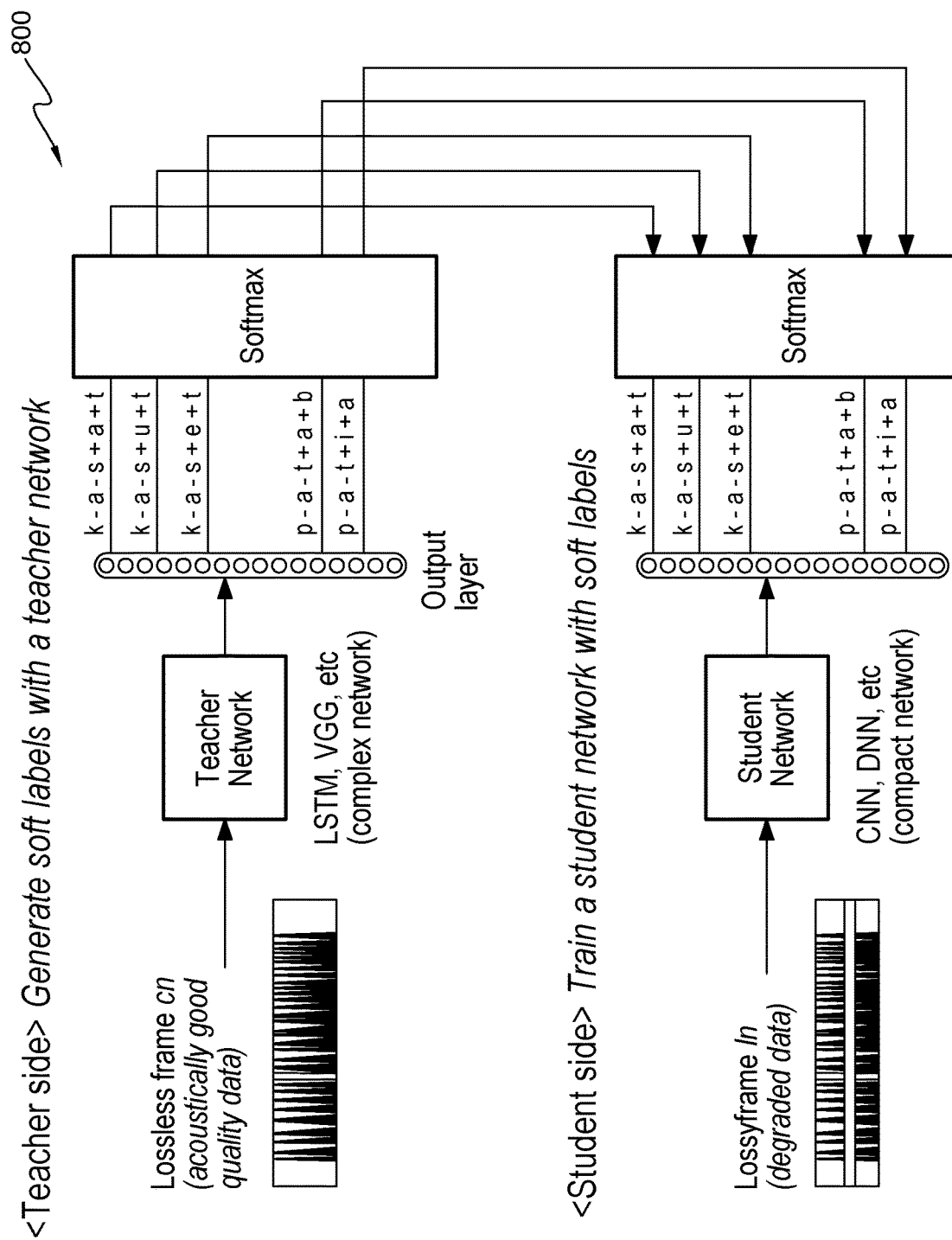
FIG. 8 is diagram showing a fourth embodiment method.

Diagram 800 of FIG. 8 shows a fourth embodiment method of the present invention. One set of parallel data is available. For example, clean and noisy data. Teacher network T is trained with special data which is only available during training time. For example, clean speech is used to train teacher network here. Input for the student is noisy speech while corresponding soft labels are generated with clean speech so that student network trains a behavior like clean speech is input against the actual noisy speech. A spectrum in which a certain frequency range is missing lossy spectrum It isn't apparent which frequency range is missing in the lossy spectrum. Missing frequency position and bandwidth are not unique.

Figure 9:
FIG. 9 is a table showing results for a pair of teacher networks.

Table 900 of FIG. 9 show a performance comparison between two teacher ML frameworks using teacher training with a standard method (single-view branch teacher). One goal is to create a teacher network that produces outputs with lossy spectrum that match as close as possible to outputs of a teacher network that operates on its corresponding loss-less spectrum. This table shows a teacher with loss-less spectrum (Teacher-LL) and a teacher with lossy spectrum (Teacher-LS), and "Test-set lossy" is a lossy version of "Test-set clean." The values shown are the average WERs of Hub5 and CH. As stated previously, a goal on the teacher network side is to make Teacher-LS (clean and loss) perform as close as possible to Teacher-LL (Test-set clean).

Figure 10:
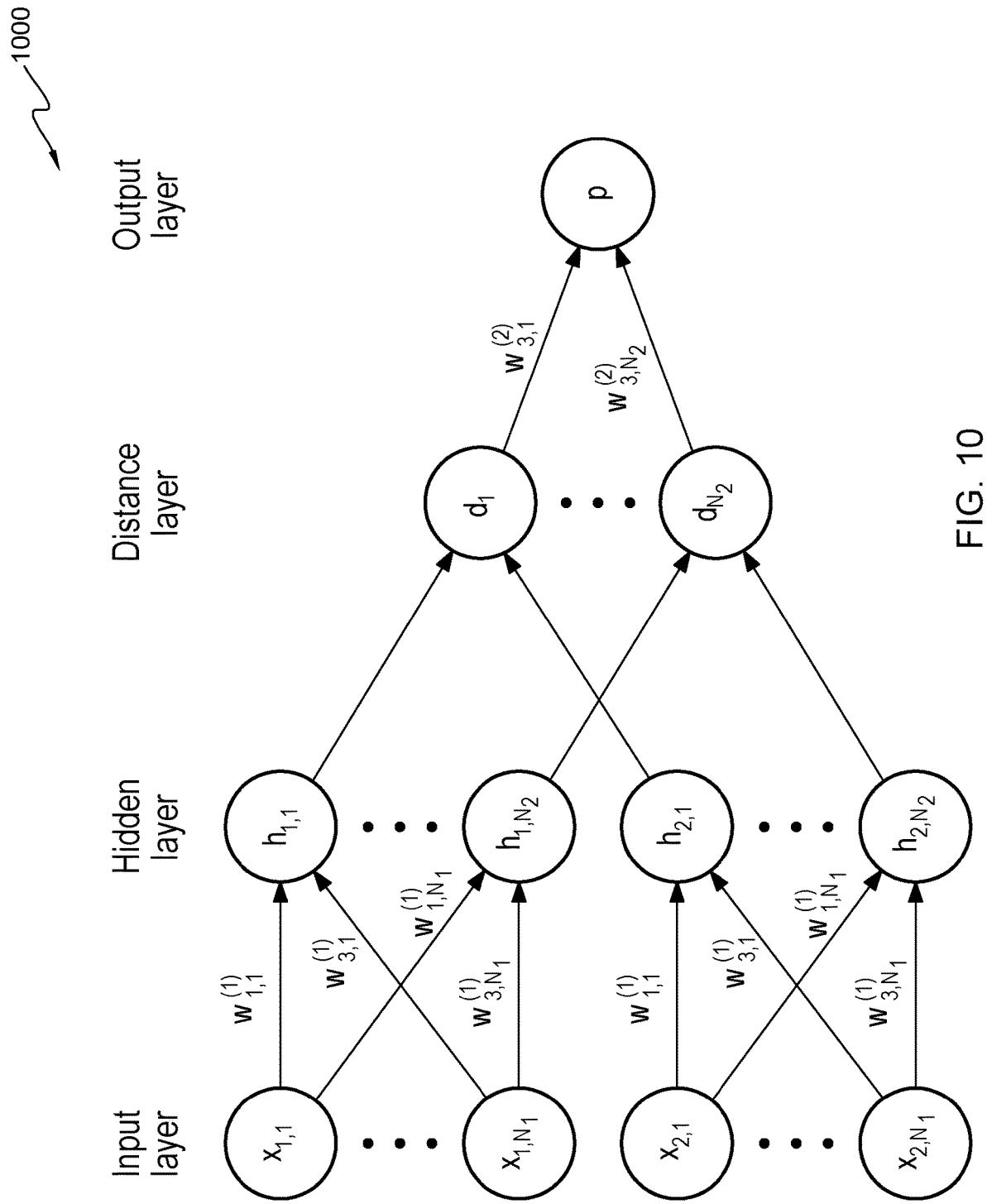
FIG. 10 is diagram showing an arrangement of layered nodes according to an embodiment of the present invention.

Diagram 1000 of FIG. 10 shows an arrangement of layered nodes according to an embodiment of the present invention.

Table 1100 of FIG. 11 shows word error rate results of a plurality of machine learning models including some embodiments of the present invention, such as the Student CNN-E. T baseline CNN-LL was trained with only lossless (LL) features. Lossy (LS) case uses not only LS but also loss-less (LL) features. "Test-set lossy" is a lossy version of "Test-set clean."

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

In an Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and application-specific integrated circuit (ASIC) based devices.

What is claimed is:

1. A computer-implemented method (CIM) comprising:
receiving a training data set, with the training data set including at least one lossy audio recording, at least one lossless audio recording and a corresponding label;
training a teacher neural network with at least a first branch and a second branch, wherein training the teacher neural network comprises:
determining a first branch output using the first branch to process the at least one lossless audio recording;
determining a second branch output using the second branch to process the at least one lossy audio recording;
quantifying a first loss value as a difference between the corresponding label and the first branch output;
quantifying a second loss value as a difference between the second branch output and the first branch output; and
modifying weights for the first branch and the second branch based on a sum of the first loss value and the second loss value; and
responsive to receiving a test input data set including a lossy audio recording, generating a set of soft-targets for training a student network based, at least in part, on the second branch and the test input dataset.

2. The CIM of claim 1, wherein the first branch and the second branch of the teacher neural network are structured as a twofold Siamese network.

3. The CIM of claim 2, wherein the twofold Siamese network further includes weights for the first branch and the second branch.

4. The CIM of claim 3, wherein:
the weights for the first branch and the second branch are determined based, at least in part, on outputs from the first branch and the second branch according to a backpropagation technique; and
the weights for the first branch and the second branch are tied together.

5. The CIM of claim 1, wherein:
the first branch of the teacher neural network is further trained using privileged knowledge that is isolated from the second branch of the teacher neural network; and the set of soft-targets are generated by the second branch of the teacher neural network isolated from the first branch of the teacher neural network.

6. The CIM of claim 1, further comprising:
initializing a student neural network for identifying features in audio recordings of human speech based, at least in part, on the generated set of soft-targets.

7. A computer program product (CPP) comprising:
a machine readable storage medium; and
computer code stored on the machine readable storage medium, with the computer code including instructions for causing a processor set to perform operations including the following:
 receiving a training data set, with the training data set including at least one lossy audio recording, at least one lossless audio recording and a corresponding label,
 training a teacher neural network with at least a first branch and a second branch, wherein training the teacher neural network comprises:
  determining a first branch output using the first branch to process the at least one lossless audio recording;
  determining a second branch output using the second branch to process the at least one lossy audio recording;
  quantifying a first loss value as a difference between the corresponding label and the first branch output;
  quantifying a second loss value as a difference between the second branch output and the first branch output; and
  modifying weights for the first branch and the second branch based on a sum of the first loss value and the second loss value; and
 responsive to receiving a test input data set including a lossy audio recording, generating a set of soft-targets for training a student network based, at least in part, on the second branch and the test input dataset.

8. The CPP of claim 7, wherein the first branch and the second branch of the teacher neural network are structured as a twofold Siamese network.

9. The CPP of claim 8, wherein the twofold Siamese network further includes weights for the first branch and the second branch.

10. The CPP of claim 9, wherein:
the weights for the first branch and the second branch are determined based, at least in part, on outputs from the first branch and the second branch according to a backpropagation technique; and
the weights for the first branch and the second branch are tied together.

11. The CPP of claim 7, wherein:
the first branch of the teacher neural network is further trained using privileged knowledge that is isolated from the second branch of the teacher neural network; and
the set of soft-targets are generated by the second branch of the teacher neural network isolated from the first branch of the teacher neural network.

12. The CPP of claim 7, wherein the computer code further includes instructions for causing the processor(s) set to perform the following operations:
initializing a student neural network for identifying features in audio recordings of human speech based, at least in part, on the generated set of soft-targets.

13. A computer system (CS) comprising:
a processor set;
a machine readable storage medium; and
computer code stored on the machine readable storage medium, with the computer code including instructions for causing the processor set to perform operations including the following:
 receiving a training data set, with the training data set including at least one lossy audio recording, at least one lossless audio recording and a corresponding label,
 training a teacher neural network with at least a first branch and a second branch, wherein training the teacher neural network comprises:
  determining a first branch output using the first branch to process the at least one lossless audio recording;
  determining a second branch output using the second branch to process the at least one lossy audio recording;
  quantifying a first loss value as a difference between the corresponding label and the first branch output;
  quantifying a second loss value as a difference between the second branch output and the first branch output; and
  modifying weights for the first branch and the second branch based on a sum of the first loss value and the second loss value; and
 responsive to receiving a test input data set including a lossy audio recording, generating a set of soft-targets for training a student network based, at least in part, on the second branch and the test input dataset.

14. The CS of claim 13, wherein the first branch and the second branch of the teacher neural network are structured as a twofold Siamese network.

15. The CS of claim 14, wherein the twofold Siamese network further includes weights for the first branch and the second branch.

16. The CS of claim 15, wherein:
the weights for the first branch and the second branch are determined based, at least in part, on outputs from the first branch and the second branch according to a backpropagation technique; and
the weights for the first branch and the second branch are tied together.

17. The CS of claim 13, wherein:
the first branch of the teacher neural network is further trained using privileged knowledge that is isolated from the second branch of the teacher neural network; and
the set of soft-targets are generated by the second branch of the teacher neural network isolated from the first branch of the teacher neural network.

18. The CS of claim 13, wherein the computer code further includes instructions for causing the processor(s) set to perform the following operations:
initializing a student neural network for identifying features in audio recordings of human speech based, at least in part, on the generated set of soft-targets.

* * * * *